United States Patent [19]
Collins

[11] Patent Number: 4,618,863
[45] Date of Patent: Oct. 21, 1986

[54] CONTINUOUS WAVE RADAR WITH RANGING CAPABILITY

[75] Inventor: John D. Collins, Burlington, Mass.

[73] Assignee: Raytheon Company, Lexington, Mass.

[21] Appl. No.: 537,133

[22] Filed: Sep. 29, 1983

[51] Int. Cl.[4] .............................................. G01S 13/32
[52] U.S. Cl. .................................. 342/194; 364/728; 342/196; 342/93; 342/128
[58] Field of Search ................. 343/5 NQ, 5 SA, 9 R, 343/5 FT, 17.5, 7 PF, 14, 5 CE, 5 CF, 5 DP, 17.2 PC; 364/423, 728; 367/40, 100, 101

[56] References Cited

U.S. PATENT DOCUMENTS

| | | | |
|---|---|---|---|
| 3,623,097 | 11/1971 | Femenias | 343/14 |
| 3,863,058 | 1/1975 | Savit | 364/728 |
| 3,875,391 | 4/1975 | Shapiro et al. | 364/736 |
| 4,003,054 | 1/1977 | Goldstone | 343/5 NQ |
| 4,028,700 | 6/1977 | Carey et al. | 343/17.2 PC |
| 4,037,202 | 7/1977 | Terzian | 364/200 |
| 4,176,351 | 11/1979 | DeVita et al. | 343/9 R |
| 4,292,635 | 9/1981 | Rittenbach | 343/5 NQ |
| 4,450,531 | 5/1984 | Kenyon et al. | 364/728 X |

OTHER PUBLICATIONS

M. I. Skolnik, *Radar Handbook*, 1970, McGraw-Hill, N.Y.; p. 35-12, "Quad. Channels".

*Primary Examiner*—Thomas H. Tarcza
*Assistant Examiner*—Bernarr Gregory
*Attorney, Agent, or Firm*—Philip J. McFarland; Richard M. Sharkansky

[57] ABSTRACT

A frequency modulated continuous wave radar wherein analog signals received from a target are converted to digital form, processed by correlation with differently delayed signals, also in digital form, of a modulation waveform repetitively applied to the transmitted signals and the frequency spectra of the resulting signals are determined, such spectra being indicative of range of the target. In addition, a digital correlator adapted to perform the desired correlation is shown.

3 Claims, 2 Drawing Figures

CONTINUOUS WAVE RADAR WITH RANGING CAPABILITY

BACKGROUND OF THE INVENTION

This invention pertains generally to continuous wave (CW) radar systems and particularly to an improved signal processing technique for processing a frequency modulated (FM) CW waveform to obtain unambiguous target range and range gate (Doppler) in a single radar dwell.

It is known in the art that a CW radar may be modified so that the range of a selected target may be measured. Thus, if the transmitted signal periodically is frequency modulated (by a linear sawtooth, triangular or sinusoidal modulation signal) in an appropriate manner, the range of any target may be determined by correlating all echo signals with differently delayed replicas of the transmitted signals to find the propagation delay of the echo signals from each target. Range then is determined where the correlation process indicates the best match between a particular delayed replica and received signal. One example of a known CW radar adapted to range measurement is shown and described in U.S. Pat. No. 4,176,351 assigned to the same assignee as the present application. In the just-cited patent the modulation signal is sinusoidal (262 Hz with a peak carrier deviation of 3 KHz), with eight tapped quartz delay lines and a corresponding number of correlation mixers used to effect the requisite correlation process. Range rate of each target, as indicated by the Doppler shift frequency of the echo signals from each target, is then determined in a conventional way from signals received during periods in which the transmitted signal is unmodulated CW. Although the CW radar shown in U.S. Pat. No. 4,176,351 is effective in many applications, the quartz delay lines limit the number of applications. For example, it is difficult, if not impractical, to use a CW radar as taught in U.S. Pat. No. 4,176,351 in guided missiles. The size, weight and susceptibility of quartz delay lines to damage from shock, vibration and temperature extremes are the causes of difficulty in such applications. Further, in order to reject signals from stationary clutter, the CW radar contemplated in U.S. Pat. No. 4,176,351 is arranged to downconvert received signals to a first intermediate frequency, then to filter out returns from stationary clutter and then to upconvert any remaining signals to a second intermediate frequency by heterodyning any such remaining signals with a local oscillator signal having the same deviation as the transmitted signal. It is, however, difficult to accomplish downconversion and upconversion (with a desired redeviation of the finally obtained signals) without introducing undesired intermodulation effects. Further, because an excessively large number of range/-Doppler sidelobes are engendered by a sinusoidally modulated FM waveform, targets with the same Doppler shift frequency at different ranges as well as targets with small cross-sections in the presence of targets with large cross-sections are difficult to detect.

SUMMARY OF THE INVENTION

With the foregoing background of the invention in mind, it is a primary object of this invention to provide a method of modulating a CW waveform to measure the range and Doppler shift of targets during a single target dwell, the amount of signal processing hardware required to carry out the method being significantly reduced from the amount of such hardware hitherto required.

It is another object of this invention to provide a method for encoding a CW waveform to measure the range and Doppler shift of targets during a single target dwell and to provide improved detection capabilities against targets with the same Doppler shift but at different ranges.

These and other objects of this invention are attained generally by utilizing a linear FM waveform repetitively to encode a transmitted signal. The modulating waveform is generated by storing digital signals indicative of the desired modulation in a read only memory (ROM) and then digital-to-analog converting such stored waveform to modulate the transmitted signal. Echo signals, after filtering to eliminate clutter signals, are converted to corresponding digital signals and correlated with the complex conjugates of signals that would be received from targets equally spaced in range on either side of a number of predetermined ranges. Each of the so-correlated signals is then passed through a fast Fourier transform (FFT) processor to determine the frequency spectrum of each so-correlated signal. The determined frequency spectra are then processed to derive the desired values of range and range rate.

BRIEF DESCRIPTION OF THE DRAWINGS

Other objects and many of the attendant advantages of this invention will be readily appreciated as the same becomes better understood by reference to the following detailed description when considered in connection with the accompanying drawings in which.

DESCRIPTION OF THE PREFERRED EMBODIMENT

Before referring to the FIGURES in detail, it should be appreciated that simplifications have been made in the interest of clarity. For example, it will be seen that any of the well known sources of timing and control signals to the various elements has not been shown because the illustration of such a source is not necessary to an understanding of the inventive concept.

Figure 1:
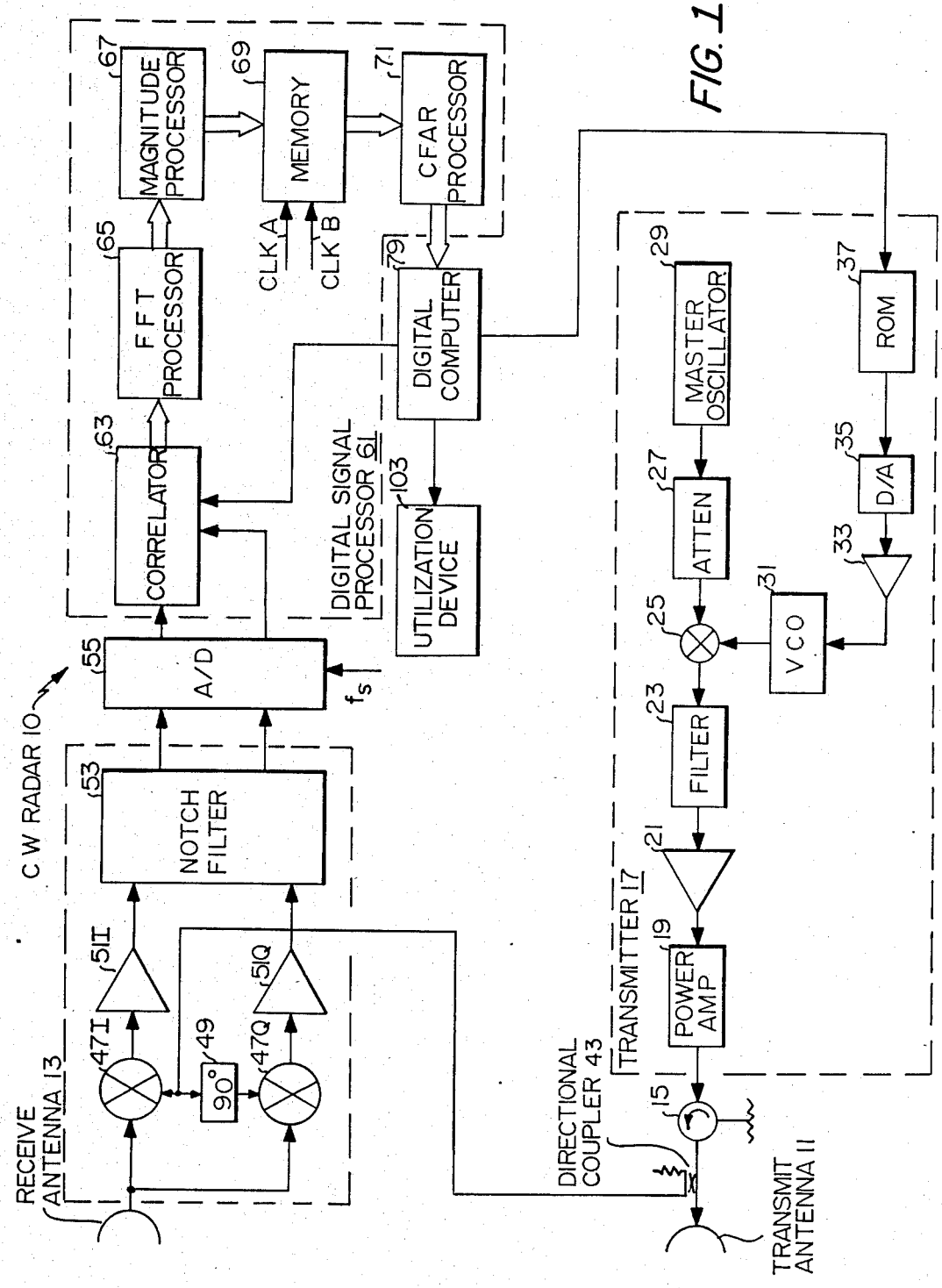
FIG. 1 is a simplified block diagram of a CW radar employing FM modulation according to this invention.

Referring now to FIG. 1, a CW radar 10 for implementing the contemplated method is shown to include a transmit antenna 11 and a receive antenna 13. The transmit antenna 11 is connected, via a circulator 15, to a transmitter 17 that is shown to include a power amplifier 19, a drive amplifier 21, a filter 23, a mixer 25, an attenuator 27, a master oscillator 29, a voltage-controlled oscillator (VCO) 31, an amplifier 33, a digital-to-analog (D/A) converter 35, and a read only memory (ROM) 37, all of which are here arranged to produce an FM modulated CW signal to be transmitted from the transmit antenna 11. Thus, the master oscillator 29, which is of conventional design and may, for example, comprise a crystal-controlled multiplier chain, is here arranged to provide an unmodulated CW output signal at X-band that is passed, via the attenuator 27, to the mixer 25. The second input to the mixer 25 is taken from the output of the VCO 31. The just-mentioned VCO in turn is controlled either by a signal from the amplifier 33 (which signal here is a triangular waveform having a frequency of 150 Hz and a peak amplitude to deviate the frequency of the VCO by 7.5 KHz) or by a sine wave having a frequency of 150 Hz from a sine wave oscillator 34. The particular modulation waveform chosen in any given situation is, as is known in the art, dependent upon the amount of clutter. As a result, then, the output of the mixer 25 is similarly FM modulated. The frequency of 150 Hz here allows range measurement without ambiguity. Digitized versions of several waveforms are stored within the ROM 37. The particular ranging waveform chosen is selected by means of a control signal provided to the ROM 37 by a digital computer 41 and converted to an analog waveform by the D/A converter 35 to allow the deviation of the VCO 31 to be changed. The resulting FM modulated CW output signal from the mixer 25 is filtered in the filter 23 to reject undesired sidebands and is then passed, via the drive amplifier 21, to the power amplifier 19.

A portion of the signal out of the transmitter 17 is coupled to the receiver (not numbered) via a directional coupler 43 to provide a local oscillator signal that is an undelayed replica of the transmitted signal.

The signals received by the receive antenna 13 are split and applied to a pair of mixers 47I, 47Q wherein such signals are downconverted to in-phase (I) and quadrature phase (Q) signals by being heterodyned with the undelayed replica of the transmitted signal from the directional coupler 43. The output signal from such coupler is split, with a first portion applied directly to mixer 47I and a second portion applied, via a 90° phase shifter 49, to mixer 47Q so that "in phase" (I) and "quadrature" (Q) signals are produced.

It will now be recognized that, upon heterodyning in the mixers 47I, 47Q: (a) the propagation delay experienced by any return signal, i.e., range of any target, changes the degree of correlation between any such signal and the local oscillator signal; and (b) the Doppler shift experienced by any return signal has a constant effect on the degree of correlation between any such signal and the local oscillator signal. It follows then that the spectrum of ground return signals (signals from relatively short range with relatively low Doppler shifts) is relatively narrow and centered on a relatively low frequency. On the other hand, the spectrum of target return signals (signals from relatively long range with a relatively high Doppler shift) is relatively wide and centered about the Doppler frequency.

In view of the foregoing the output signals from the mixers 47I, 47Q are passed, via amplifiers 51I, 51Q, to a notch filter 53 having a high pass characteristic. Such filter then is effective to attenuate the ground return signals and to pass any target return signals centered on a Doppler shift frequency differing substantially from zero frequency. It will now be appreciated by those of skill in the art that any filtered signals will include a small residual FM deviation having a peak value dependent on the range of the source of such signals. It should be noted here in passing that: (a) if the return signals are from a stationary object, the output signal from the mixers 47I, 47Q will be at a beat frequency of constant frequency (except at the transition regions of the modulating waveform) that is proportional to range; and (b) if the return signal is from a moving object, the Doppler shift will be superposed on the beat frequency. In either case, however, the signals out of the mixers 47I, 47Q may be considered to have a constant frequency when a linear triangular wave FM modulation is used. If, on the other hand, sine wave FM modulation were utilized, the output from the mixers 47I, 47Q would cover a spectrum of frequencies. The composition of the output signals from the mixers 47I, 47Q is of concern because of the ranging errors that may result from the group delay characteristics of the notch filter 53. When the output signal from the mixers 47I, 47Q is considered to be at a constant frequency, the group delay characteristics of the notch filter 53 are of little or no consequence. On the other hand, when the output from the mixers 47I, 47Q covers a spectrum, the group delay characteristics of the notch filter 53 will introduce ranging errors.

The I and Q output signals from the notch filter 53 are digitized in an analog-to-digital (A/D) converter 55 at a rate here designated $f_s$. The digitized I and Q output signals from the A/D converter 55 are passed to a digital signal processor 61.

The digital signal processor 61 is shown to include a digital correlator 63, an FFT signal processor 65, a magnitude processor 67, a memory 69, and a constant false alarm rate (CFAR) processor 71. The digital signal processor 61 is effective to convert digitized time domain data into a range/Doppler map format and to report CFAR threshold crossings within the map to the digital computer 79.

Digressing briefly here now for a moment, the triangular wave linear FM modulation impressed on the transmitted carrier may be expressed as:

$$s_T(t) = e^{\pm j(2\Delta F \omega_m t^2)} \quad (1)$$

where "$\Delta F$" is the transmitted peak deviation and "$\omega_m$" = $2\pi f_m$ where $f_m$ is the modulation rate. The positive exponent represents the up ramp of the triangular wave modulating waveform, while the negative exponent represents the down ramp. The receive waveform at the output of the mixers 47I, 47Q is $s_r(t)$ given by $$s_r(t) = e^{\pm j(4\Delta F \omega_m \tau t - \omega_d t)} \quad (2)$$

where $\omega_d$ is the Doppler shift frequency, in radians and $\tau$ is range delay in seconds. The reference waveforms stored within the PROM which correspond to the complex conjugate of the A/D sampled return signals at the instrumented ranges may be expressed as:

$$s^*(n,k) = W(n) e^{+-j\frac{(4\Delta F \omega_m k n)}{f_s^2}} \quad (3)$$

where "W(n)" are weights applied to reduce the Doppler sidelobes associated with the waveform, and the following substitutions have been made:

$$t = \frac{n}{f_s}, \tau = \frac{k}{f_s} \quad (4)$$

where "k" is a delay index that is a multiple of the sample period.

It should be noted here in passing that the weights W(n) are provided to gate out switching transient blanking between the transition of the two waveform portions and to time weight with two windows. In this fashion the two portions of the waveform are coherently integrated.

The multiplication process within the digital correlator 63 simply removes the FM modulation impressed on the return signals as a function of range delay. Matched filter processing for the instrumented ranges occurs within the FFT processor 65. As will be appreciated, the function of the FFT processor 65 is to convert time domain data to frequency domain data. The output of the FFT processor 65 is then a stream of 12 bit words corresponding to the I and Q components of frequency domain data.

The output of the FFT processor 64 is passed to the magnitude processor 67, here of conventional design, wherein the magnitude ($\sqrt{(I)^2+(Q)^2}$) of each point of the frequency domain data is computed. Each point, expressed as a 12 bit number, from the magnitude processor 67 is passed to the memory 69.

The memory 69 is effective to accept frequency domain data at a 3 MHz rate, store only that part of such data corresponding to targets and then pass the stored data at a 6 MHz data rate to the CFAR processor 71.

The CFAR processor 71 performs CFAR detection in a known manner on the range/Doppler data from the memory 69. For each target detection within the CFAR processor 71 the Doppler filter number associated with the detection and the magnitude of the signal within that filter are reported to the digital computer 79.

The digital computer 79 which here may, for example, be similar to the one shown in U.S. Pat. No. 4,037,202, inventor John Terzian, issued July 19, 1977 and assigned to the same assignee as the present application, is effective to perform target range and Doppler interpolation functions. The target locations derived in the digital computer 79 are reported to a utilization device 103 which may, for example, be a cathode ray display tube.

It will now be appreciated that, except when the propagation delay of signals received from a target is equal to the time delay (relative to a modulated CW transmitted signal) of one of the 12 bit coefficients out of the PROM 87 (FIG. 2), the output of the FFT 65 will lie in two different "frequency bins." That is to say, except for signals from targets having the same propagation delay as one of the ten delays here instrumented, a processing loss will be experienced.

Linear FM modulation waveforms offer an advantage of flexibility in that, in a low clutter environment, FM with a greater deviation may easily be provided in order to increase range resolution, or, in a high clutter environment, less deviation may similarly be provided in order to reduce clutter spreading. It will be appreciated that a change in the modulation waveform read out from the ROM 37 (FIG. 1) will require a corrsponding change to the waveform out of the PROM 87 (FIG. 2).

Finally, it should be noted that for a given amount of hardware resources a linear FM modulation waveform will provide a wider dynamic range than a sine wave FM modulation waveform. That is to say, the range interpolation with the sine wave FM waveform requires a FET processor for each instrumented range. Adequate range and Doppler information may be obtained from a linear FM waveform by providing a matched filtering at only two ranges, one on either side of a desired detection range.

Figure 2:
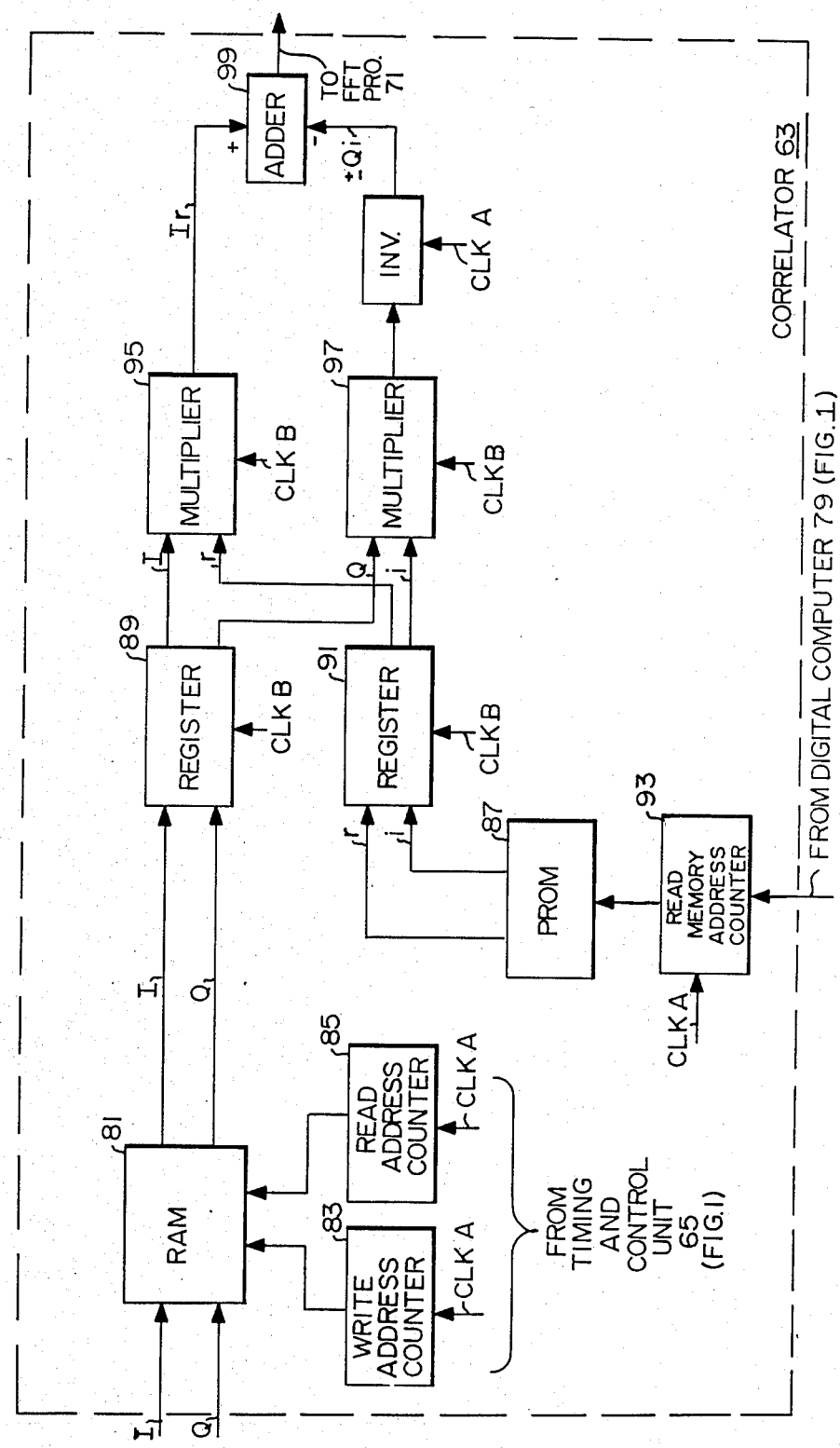
FIG. 2 is a block diagram of a correlator as contemplated herein.

Referring now to FIG. 2, the digital correlator 63 between the A/D 55 and the FFT processor 65 (FIG. 1) receives the I and Q signals out of the A/D 55 in a 2K by 24 bit random access memory (RAM) 81. Such I and Q numbers are written into the RAM 81 at a 30 KHz data rate with the I numbers stored in the left half of the memory and the Q numbers in the right half of the memory. A write memory address counter 83 is used to control the write addressing. The correlator 63 receives 1024 complex (I and Q) digital numbers, each with 12 bits, during each data input period. A total of 2048 complex digital numbers provided during two successive data input periods are treated as a block of data. Two blocks of data can be written into the RAM 81 before starting to overwrite old data. The blocks of data are read out of the RAM 81 under the control of a read address counter 85. To ensure that, during the read cycle, 2048 complex digital numbers are available in the RAM 81, there is a permanent block offset between read address counter 85 and the write address counter 83.

The complex digital numbers read out of the RAM 81 are multiplied, in a manner to be described, by individual ones of a set of 12 bit coefficients stored in a programmable read only memory, PROM 87. The multiplication is effective to perform a time weighting function to reduce FFT sidelobe levels and to multiply by the complex conjugates of ten differently delayed replicas of the transmitted signal. The multiplication process is repeated ten times on each block out of the RAM 81, producing a corresponding number of time-weighted and adjusted blocks of data for ten different ranges.

Digressing briefly here now for a moment and referring back to FIG. 1, if the signal transmitted by the transmit antenna 11 is of the form:

$$s(t) = e^{j(\frac{\Delta F}{f_m} \sin \omega_m t + 2\pi f_t t)} \tag{5}$$

where "$\Delta F$" is the peak deviation of transmitted sine wave FM modulation, "$f_m$" is the modulation rate, and "$f_t$" is the transmitted frequency, then the signals at the output of the mixers 47I, 47Q may be represented as:

$$s(t) = e^{j(\frac{2\Delta F}{f_m} \sin \frac{\omega_m \tau}{2} \cos(\omega_m t - \frac{\omega_m \tau}{2}) + 2\pi f_d t)} \tag{6}$$

where "$\tau$" is the range delay and "$f_d$" is the target Doppler frequency. The video output signals from the mixers 47I, 47Q are digitized in the A/D converter 55 at a rate $f_s$. The analog signal is converted to digital by substituting (n/$f_s$) for time, t, where n=0, 1, 2, ..., N−1. Here N is the total number of samples to store thirty-four milliseconds (ms) of data. Likewise, $\tau$, the analog delay is replaced by (k/$f_s$) where k is a delay sample index (k=0, 1, 2, ... K−1). Thus, the complex conjugate of the A/D sampled waveform that is stored within the PROM 87 (FIG. 2) may be expressed as:

$$s^*(n,k) = e^{-j(\frac{2\alpha F}{f_m} \sin \frac{\omega_m}{2} \frac{k}{f_s} \cos(\frac{mn}{f_s} - \frac{\omega_m k}{2f_s}))} \tag{7}$$

The time delay samples are at discrete steps of the clock period. Thus, for five kilometer (km) range gate steps the clock period should be thirty-three microseconds (μs) or, equivalently, the sample rate $f_s$ should be 30 KHz. At a sample rate of 30 KHz for thirty-four ms the value N is set to 1024. That is to say, for each range correlation, 1024 multiplies are performed every thirty-four milliseconds.

Referring back now to FIG. 2 it will be remembered that the range reference waveforms (i.e., the complex conjugates of differently delayed transmitted signals) are stored within the PROM 87 which has a capacity of 10240 complex digital numbers, each having twenty-four bits. The first twelve bits of each complex digital number are the real portion of the reference number, r, and the second twelve bits are the imaginary portion of the reference number, i.

Each number in successive blocks out of the RAM 81 are multiplied by each one of the ten 1024 range reference numbers during each complete cycle of the read address counter 85. Output data terms from the digital correlator 63 then are of the form (Ir−Qi) and (Ii+Qr). The sequence of events is as follows: (a) each addressed digital number is passed from the RAM 81 to a register 89 at a 3 MHz rate in response to a 3 MHz clock (CLK A) signal applied to the read address counter 85; (b) each addressed digital number is passed from the PROM 87 to an inverting register 91 at a 3 MHz rate in response to the CLK A signal applied to a read memory address counter 93; (c) the real and imaginary parts of the digital numbers in registers 89, 91 are passed at a 6 MHz rate (by the CLK B signal) to multipliers 95, 97 as shown; (d) the products Ir and Qi are formed in the multipliers 95, 97; and (e) the products Ir, Qi (after inversion of the product Qi) are applied to the adder 99 finally to produce (Ir−Qi).

The I and Q data are clocked out of the RAM 81 into the register 89 at a 3 MHz rate and the data from the PROM 87 are clocked into the inverting register at the same rate. The holding registers 89 and the inverting register 91 are both clocked at a 6 MHz rate (CLK B). The inverting register 91 is effective to gate the real (r) and imaginary (i) data from the PROM 87 to multipliers 95, 97, respectively, on the first clock pulse during each period of the CLK A. The latter, which are also clocked at the 6 MHz rate (CLK B), are effective to form the products Ir and Qi, respectively, on the first clock pulse. The output from the multiplier 95 is passed directly to an adder 99, while the output from the multiplier 93 is passed, via an inverter 101, to the adder 99. The latter then is effective to form the output (Ir−Qi) during the first CLK B period. The second clock signal received by the inverting register 91 causes that device to gate the (r) and (i) data to multipliers 97, 95, respectively. The multipliers then form the products Ii and Qr, respectively, on the second clock pulse. The inverter 101 is disabled on every other clock pulse and, therefore, the adder 99 is effective to form the output (Ii+Qr) during the second clock period. The read address counters 85, 93 are then incremented and a new data word is ready to be processed as above.

As mentioned hereinabove, the 1024 data words from the RAM 81 are complex-multiplied by each of the ten 1024 range reference words during each read cycle of the correlator 63. To this end, the length of the read memory address counter 93 is fifteen bits (the least significant bit not being utilized) to ensure addressing of the entire 10K PROM 87. It will now be appreciated by those of skill in the art that the read address counter 85 must recirculate ten times during each read cycle. Further, because the output of the correlator 63 is passed directly to the FFT processor 65, the addressing by the read address counter 85 is to have the FFT processed data come out in a natural ordered sequence. Bit reversal is accomplished by connecting the least significant bit (LSB) of the read address counter 85 to the most significant bit (MSB) of the RAM 81 and the MSB of the counter 85 to the LSB of the RAM 81. The correlator 69 provides the input (in bit-reversed order and at a 6.0 MHz rate) to the FFT signal processor 65 (FIG. 1).

Referring back now to FIG. 1, the FFT processor 65 takes each 1024 point block of complex data from the correlator 63 and performs a Fast Fourier Transform on it, using twelve bit arithmetic at a 6 MHz rate. The FFT processor 65 may, for example, be similar to the one described in Shapiro et al, U.S. Pat. No. 3,875,391 issued Apr. 1, 1975 and assigned to the same assignee as the present invention. As will be appreciated, the function of the FFT processor 65 is to convert the 1024 points of time domain data to 1024 points of frequency domain data. The output date from the FFT processor 65 are passed to a magnitude processor 67, here of conventional design, wherein the magnitude ($\sqrt{(I)^2+(Q)^2}$) of each point of the I and Q frequency domain data is computed. The output data rate of the magnitude processor 67 is 3 MHz, or half that of the input data rate. The twelve bit frequency domain data from the magnitude processor 67 are passed to a memory 69.

The memory 69 accepts input data from the magnitude processor 67 at a 3 MHz rate and provides output data to the CFAR processor 71 at a 6 MHz rate. It should be noted here that the storage of ten entire sets of magnituded FFT data corresponding to one original block of 1024 time domain samples, multiplied by ten different sets of range-referenced modulation coefficients, is not required due to the nature of the postprocessing function. The contents of filters 0 through 511 are stored because they correspond to the Doppler spectrum associated with approaching targets, while the contents of filters 512 through 1023 are stored because they correspond to the Doppler spectrum associated with receding targets.

The memory 69 stores the current set of 10240 (1024 words for each of ten sets) 12 bit data words while still holding the previously stored 10240 12 bit words for use by the CFAR processor 71. Consequently, the total storage capacity of the memory 69 is 20480 words by 12 bits. As previously mentioned, the data are written into the memory 69 at a 3 MHz rate and are read out to the CFAR processor 71 at a 6 MHz rate.

The CFAR processor 71 performs CFAR detection, in a known manner, on the range-Doppler data from the memory 69. The processing function is identical for both approach and recede data. Processing starts in the low range, high Doppler region of the approach bank of filters (filters 0 through 511) and moves down the map in range and then across in Doppler. The processing for the recede bank of filters (filters 512 through 1023) follows the same route, starting in the low range, high Doppler region and proceeding down in range. The number of target detections declared in the CFAR processor 71 are reported to the digital computer 79. For each target detection, the Doppler filter number associated with the detection together with the magnitude of the signal within that filter are reported to the digital computer 79.

The digital computer 79 which here may, for example, be similar to the one shown in U.S. Pat. No. 4,037,202, inventor John Terzian, issued July 19, 1977 and assigned to the same assignee as the present application, is effective to perform the target range and Doppler interpolation function. Such interpolation process is identical to that described in DeVita et al (U.S. Pat. No. 4,176,351) and will therefore not be recounted here. The target locations derived in the digital computer 79 are reported to a utilization device 103 which may, for example, be a cathode ray display tube.

It will now be appreciated by those of skill in the art that utilizing a FFT processor to provide a matched filter response to the received signals offers both dynamic range and speed advantages vis-a-vis the classical approach to a matched filter utilizing a tapped delay line with a weighted summation. The performance level of an FFT matched filter depends upon the number of quantization bits used in the process, the rounding-truncation rules, and whether fixed or floating point arithmetic is employed. Using a simplified floating point algorithm provides high performance levels with a minimum of hardware complexity.

The range reference data which are the complex conjugates of the A/D sampled received waveform corresponding to different instrumented ranges are written into the PROM 87 (FIG. 2) prior to the initialization of the radar system 10. It will be recognized by those of skill in the art that the PROM 87 must be interchangeable with other similar devices so that the radar system 10 will have the flexibility to counter different environmental conditions. That is to say, clutter or other interference at various ranges will have the effect of changing the modulation (deviation) of the return signals from those ranges. Thus, PROMs having different values of residual deviation at the instrumented ranges should be available to ensure a correlation with the A/D sampled received waveform.

Having described a preferred embodiment of the invention, it will now be apparent to one of skill in the art that other embodiments incorporating its concept may be used. It is felt, therefore, that this invention should not be restricted to the disclosed embodiment, but rather should be limited only by the spirit and scope of the appended claims.

What is claimed is:

1. In a receiver for a frequency modulated CW radar wherein received signals out of a complex mixer are processed with each one of a plurality of differently delayed signals representative of the transmitted signal to produce a like plurality of differently correlated signals, each one of the received signals, the delayed signals and the differently correlated signals being a set of complex digital numbers, each one of such numbers having a real and imaginary part, a correlator comprising:
   (a) means for storing a first set of complex digital numbers representative of received signals from a target;
   (b) means for storing a plurality of sets of complex digital numbers, each one of such sets being representative of the complex conjugate of the transmitted signal delayed by a different amount;
   (c) first multipler means, responsive to the real parts of corresponding complex digital numbers in the first set and in each one of the plurality of sets of stored complex digital numbers, for producing the product of the real parts of such complex digital numbers;
   (d) second multiplier means, responsive to the imaginary parts of corresponding complex digital numbers in the first set and in each one of the plurality of sets of stored complex digital numbers, for producing the product of the imaginary parts of such complex digital numbers;
   (e) means for changing the sign of each product out of the second multiplier means; and
   (f) means, responsive to corresponding ones of the products out of the first multiplier means and the products, with changed sign, out of the second multiplier means, for forming the like plurality of differently correlated signals.

2. A correlator as in claim 1 wherein the means for storing the plurality of sets of complex digital numbers representative of the plurality of received signals is a random access memory.

3. A correlator as in claim 2 wherein the means for storing the complex digital numbers representative of the differently delayed signals is a read only memory.

* * * * *

UNITED STATES PATENT OFFICE
CERTIFICATE OF CORRECTION

Patent No. 4,618,863  Dated 10/21/86

Inventor(s) John D. Collins

It is certified that error appears in the above-identified patent and that said Letters Patent are hereby corrected as shown below:

Page 1, below the title, insert the following clause:

- This invention was made with Government support under Contract No. DAAH01-80-C-0645 awarded by the Department of the Army. The Government has certain rights in this invention. -

Signed and Sealed this

Seventeenth Day of March, 1987

*Attest:*

DONALD J. QUIGG

*Attesting Officer*   *Commissioner of Patents and Trademarks*